United States Patent
Otero et al.

(10) Patent No.: US 9,973,926 B2
(45) Date of Patent: May 15, 2018

(54) SECURE MULTI-CHANNEL COMMUNICATION SYSTEM AND METHOD

(71) Applicant: Visa International Service Association, San Francisco, CA (US)

(72) Inventors: Cesar Otero, East Palo Alto, CA (US); Patrick Faith, Pleasanton, CA (US)

(73) Assignee: Visa International Service Association, San Francisco, CA (US)

( * ) Notice: Subject to any disclaimer, the term of this patent is extended or adjusted under 35 U.S.C. 154(b) by 64 days.

(21) Appl. No.: 15/014,535

(22) Filed: Feb. 3, 2016

(65) Prior Publication Data

US 2016/0227401 A1    Aug. 4, 2016

Related U.S. Application Data

(60) Provisional application No. 62/111,599, filed on Feb. 3, 2015.

(51) Int. Cl.
*H04W 12/04* (2009.01)
*H04L 9/08* (2006.01)
*H04L 29/06* (2006.01)
*H04W 12/02* (2009.01)

(52) U.S. Cl.
CPC .......... *H04W 12/04* (2013.01); *H04L 9/0872* (2013.01); *H04L 63/0428* (2013.01); *H04W 12/02* (2013.01)

(58) Field of Classification Search
CPC .... H04W 12/04; H04W 12/02; H04L 9/0872; H04L 63/0428
See application file for complete search history.

(56) References Cited

U.S. PATENT DOCUMENTS

| 6,041,122 | A  | * | 3/2000  | Graunke | ............... | H04L 9/0872 |
|           |    |   |         |         |                  | 380/1       |
| 6,490,353 | B1 |   | 12/2002 | Tan     |                  |             |
| 7,392,382 | B1 | * | 6/2008  | Weis    | ....................... | H04L 9/088 |
|           |    |   |         |         |                  | 173/160     |
| 7,761,704 | B2 |   | 7/2010  | Ho et al. |                |             |
| 8,938,625 | B2 |   | 1/2015  | Grab et al. |              |             |
| 2003/0099360 | A1 | | 5/2003 | Hoang   |                  |             |
| 2004/0160986 | A1 | * | 8/2004 | Perlman | .............. | H04L 63/0428 |
|           |    |   |         |         |                  | 370/480     |

(Continued)

FOREIGN PATENT DOCUMENTS

KR    10-2010-0089228 A    8/2010

OTHER PUBLICATIONS

Xiao et al., "Encrypting LDPC-Codec", Nov. 2006, 8th international Conference on Signal Processing, pp. 1-5 (Year: 2006).*

(Continued)

*Primary Examiner* — Kenneth W Chang
(74) *Attorney, Agent, or Firm* — Kilpatrick Townsend & Stockton LLP

(57) ABSTRACT

One embodiment of the invention is directed to a method comprising receiving a plurality of data packets including encoded data. The method further comprises determining a plurality of time delays between the plurality of data packets, and translating the plurality of time delays to obtain a decoding key for decoding the encoded data in the data packets. The decoding key may be used to decode the encoded data to obtain the data.

20 Claims, 10 Drawing Sheets

(56) References Cited

U.S. PATENT DOCUMENTS

| | | | |
|---|---|---|---|
| 2005/0094814 A1* | 5/2005 | Aihara | H04L 63/068 380/247 |
| 2005/0149762 A1* | 7/2005 | Smith | H04L 63/0846 726/19 |
| 2005/0254656 A1 | 11/2005 | Rose et al. | |
| 2006/0036854 A1* | 2/2006 | Liu | H04L 63/0272 713/165 |
| 2008/0080418 A1* | 4/2008 | Rofougaran | H04L 12/14 370/329 |
| 2008/0301776 A1 | 12/2008 | Weatherford | |
| 2010/0316216 A1 | 12/2010 | Fukushima et al. | |
| 2013/0236007 A1* | 9/2013 | Munro | H04L 9/0861 380/44 |

OTHER PUBLICATIONS

International Search Report dated Jun. 13, 2016 in PCT/US2016/016364, 7 pages.

* cited by examiner

| Time Delay, t, Between Data Packets (ms) | Value |
|---|---|
| $0 < t \leq 0.2$ | H |
| $0.2 < t \leq 0.4$ | N |
| $0.4 < t \leq 0.6$ | 7 |
| $0.6 < t \leq 0.8$ | A |
| $0.8 < t \leq 1.0$ | 3 |
| $1.0 < t \leq 1.2$ | W |
| $1.2 < t \leq 1.4$ | P |
| $1.4 < t \leq 1.6$ | T |
| $1.6 < t \leq 1.8$ | 0 |
| $1.8 < t \leq 2.0$ | C |
| $2.0 < t \leq 2.2$ | 9 |
| $2.2 < t \leq 2.6$ | X |
| $2.6 < t \leq 2.8$ | M |
| $2.8 < t \leq 3.0$ | 4 |
| $3.0 < t \leq 3.2$ | Z |
| $3.4 < t \leq 3.6$ | Q |
| $3.6 < t \leq 3.8$ | 1 |
| $3.8 < t \leq 4.0$ | 5 |
| $4.2 < t \leq 4.4$ | V |
| $4.4 < t \leq 4.6$ | D |
| $4.6 < t \leq 4.8$ | 8 |
| $4.8 < t \leq 5.0$ | U |
| $5.0 < t \leq 5.2$ | G |
| $5.2 < t \leq 5.4$ | 6 |
| $5.4 < t \leq 5.6$ | J |
| $5.6 < t \leq 5.8$ | 2 |

FIG. 4

SECURE MULTI-CHANNEL COMMUNICATION SYSTEM AND METHOD

SUMMARY

Embodiments of the invention are directed to systems and methods related to the transmission of data in a secure manner to prevent the data from being intercepted by third parties.

The transmission of data over wireless technologies (e.g., Bluetooth™, RF technologies) has numerous security issues. For example, data transmitted wirelessly may be intercepted by third parties. Even where the data is encrypted there is still a chance that the data may be intercepted and can be decrypted, e.g., if a person's private key was obtained. Further, key management can be onerous. With the increasing use of mobile devices to perform sensitive data functions, such as wireless mobile payments using mobile applications or mobile services, the problem is only becoming more of an issue.

Thus, there is a need for new and enhanced systems and methods of sending data wirelessly in a more secure manner.

Embodiments of the invention address these and other problems, individually and collectively.

One embodiment of the invention is directed to a method comprising receiving a plurality of data packets including encoded data. The method further comprises determining a plurality of time delays between the plurality of data packets, and translating the plurality of time delays to obtain a decoding key for decoding the encoded data in the data packets. The decoding key may be used to decode the encoded data to obtain the data.

Another embodiment of the invention is directed to a computer comprising a processor and a memory coupled to the processor. The memory stores instructions, which when executed by the processor, cause the server to perform operations including receiving a plurality of data packets including encoded data; determining a plurality of time delays between the plurality of data packets; translating the plurality of time delays to obtain a decoding key for decoding the encoded data in the data packets; and decoding the encoded data using the decoding key to obtain the data.

Another embodiment of the invention is directed to a method comprising encoding data using an encoding key. The method further comprises segmenting the encoded data into a plurality of data packets, assigning a plurality of time delays corresponding to the encoding key, and inserting the plurality of time delays between the plurality of data packets. The plurality of data packets including the plurality of time delays can then be transmitted.

These and other embodiments of the invention are described in further detail below.

BRIEF DESCRIPTION OF THE DRAWINGS

FIG. 4 shows an exemplary mapping table for translating time delays between data packets into values according to an embodiment of the present invention.

DEFINITIONS

Figure 1:
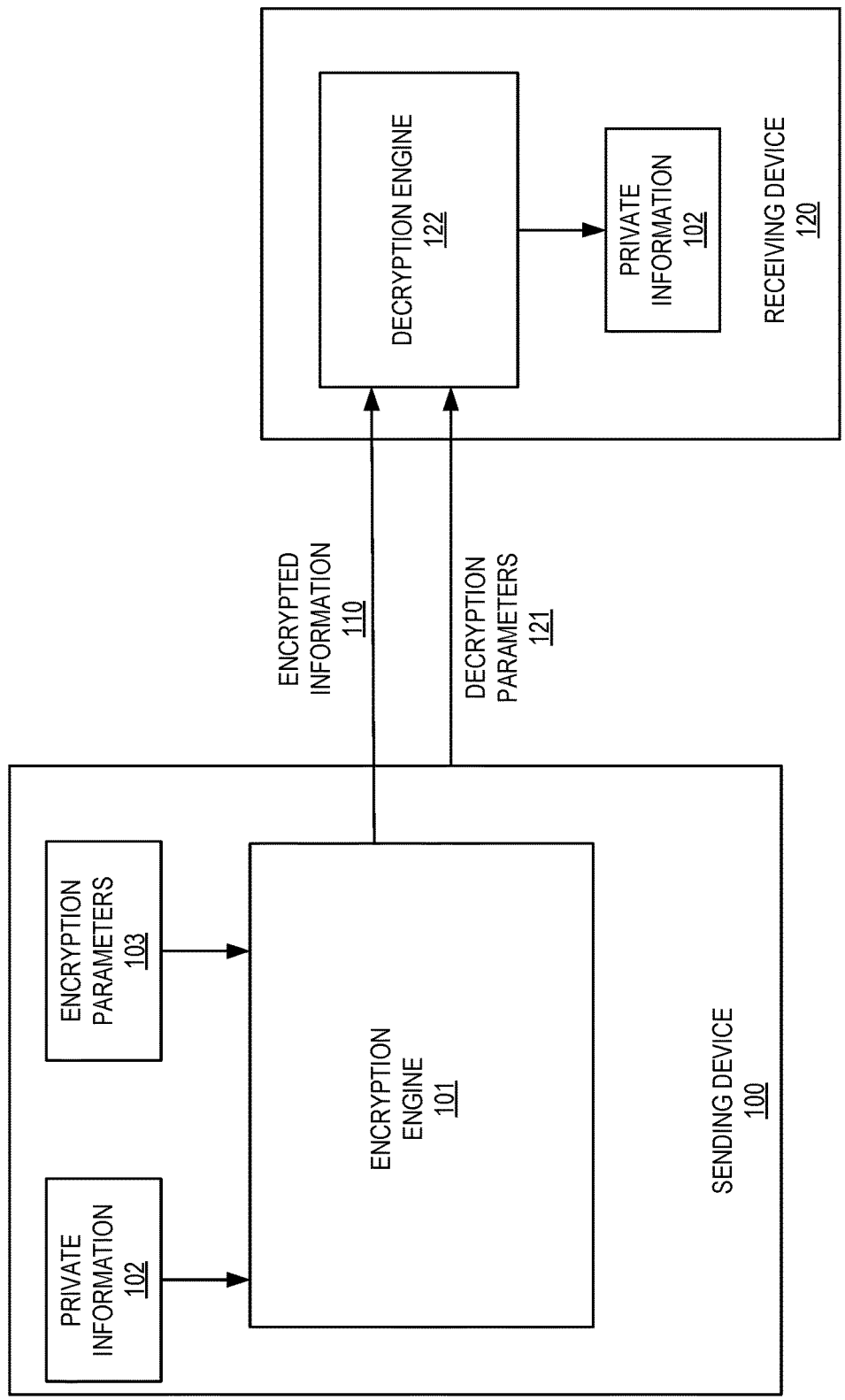
FIG. 1 is a block diagram showing an environment for encrypting and decrypting data according to an embodiment of the present invention.

Prior to discussing specific embodiments of the invention, some terms may be described in detail.

A "cipher" may include a method for performing encryption or decryption. A cipher may include a series of defined steps that operate on input data and provide output data, e.g., transforming non-encrypted data (plaintext) to encrypted data (ciphertext), or vice versa.

"Transaction data" may be data that is associated with a transaction. Examples of transaction data include a resource provider identifier, a transaction identifier, a timestamp, a transaction amount, a merchant identifier, a merchant location, a terminal identifier, an acquirer identifier (such as an acquirer bank identification number (BIN)), a card acceptor ID, information identifying items being purchased, geo-location information, a digital wallet identifier, and/or any other suitable information.

A "portable communication device" may comprise any suitable electronic device that may be transported and operated by a user, which may also provide local communication capabilities (e.g., via Bluetooth™ or RF technologies) and/or remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network. Examples of portable communication devices include mobile phones (e.g., cellular phones), PDAs, tablet computers, net books, laptop computers, personal music players, handheld specialized readers, etc. Further examples of portable communication devices include wearable devices, such as smart watches, fitness bands, ankle bracelets, rings, earrings, etc., as well as automobiles with remote communication capabilities. A portable communication device may comprise any suitable hardware and/or software for performing such functions, and may also include multiple devices or components (e.g., when a device has remote access to a network by tethering to another device—i.e., using the other device as a modem—both devices taken together may be considered a single portable communication device).

"Payment credentials" may include any suitable information associated with an account (e.g. a payment account and/or payment device associated with the account). Such information may be directly related to the account or may be derived from information related to the account. Examples of account information may include an "account identifier" such as a PAN (primary account number or "account number"), user name, expiration date, CVV (card verification value), dCVV (dynamic card verification value), CVV2 (card verification value 2), CVC3 card verification values, etc. An example of a PAN is a 16-digit number, such as "4147 0900 0000 1234." CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment credentials may be any information that identifies or is associated with a payment account. Payment credentials may be provided in order to make a payment from a payment account. Payment credentials can also include a user name, an expiration date, a gift card number or code, a payment token, and any other suitable information. In some embodiments, payment credentials may be considered private or sensitive information.

A "resource provider" may be an entity that can provide a resource such as goods, services, information, and/or access. Examples of a resource provider include merchants, access devices, secure data access points, etc. A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity can be identified by an "authorizing entity identifier", which may be a string of characters or take any other suitable form. An example of an authorizing entity identifier is an issuer BIN (bank identification number).

An "issuer" may typically refer to a business entity (e.g., a bank) that maintains an account for a user. An issuer may also issue payment credentials stored on communication device, such as a cellular telephone, smart card, tablet, or laptop to the consumer. An issuer can be identified by an issuer identifier, such as a BIN. In some embodiments, a PAN can comprise a BIN in addition to other characters. For example, the first four to six digits of a PAN may be the BIN. Thus, a PAN can indicate an associated issuer. In some embodiments, a BIN can also identify a transaction processor.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include Bluetooth™, radio frequency (RF) antennas, optical scanners, bar code readers, or magnetic stripe readers to interact with a payment device and/or mobile device.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

DETAILED DESCRIPTION

Embodiments of the present invention are directed to systems and methods for sending, receiving and processing encoded data in a secure manner. In one embodiment, encoded data may comprise transaction data, such as payment credentials.

In some embodiments, the data to be transmitted may be separated into a plurality of segments (e.g., data packets) and sent to a receiving device, such as an access device or a server computer. The plurality of data packets can be sent through different channels, such as by using different frequencies by receivers associated with a single device, or by using different frequencies by a plurality of receivers where each receiver is associated with a different device.

In embodiments of the present invention, the time delays between the plurality of data packets can be encoded with a decoding key. The decoding key can be used to determine a decryption key and/or to identify the presence and/or location of fake or pseudo-data included in the data packets for greater security. In such embodiments, the time delays between data packets may be mapped to a table of data indicating a character or value that corresponds to each time delay. In other embodiments, timestamps associated with each data packet may be used to determine the time delays, which can then be used to determine the decoding key.

Embodiments of the present invention may be used in any communication system to protect private or sensitive data from unauthorized disclosure. In one example, embodiments of the present invention may be used in transaction processing systems or may use data generated during transaction processing through a transaction processing system. Such embodiments may involve transactions between users and merchants, such as payment transactions. However, embodiments of the invention are not limited to payment transactions and can be used in any method where data is transferred between two endpoints.

I. ENCRYPTION/DECRYPTION

Encryption is the process of converting ordinary information or plaintext into unintelligible text or ciphertext. Decryption is the reverse process, converting ciphertext back to plaintext. A cipher can consist of algorithms that implement the encryption and the reversing decryption. The detailed operation of a cipher can be controlled both by the algorithm and in each instance by one or more keys. Encryption can be needed in several modern contexts to protect data transferred between two devices, such as, for example, two devices involved in a financial transaction.

FIG. 1 illustrates an environment for encrypting and decrypting information according to an embodiment of the present invention. FIG. 1 is a system diagram showing a sending device 100 with an encryption engine 101 and a receiving device 120 with a decryption engine 122. Sending device 100 can use encryption engine 101 to encrypt private information 102 using encryption parameters 103, thereby producing encrypted information 110, which can be sent to receiving device 120.

Encryption engine 101 can receive private information 102 and encryption parameters 103. Private information 102 can include data to be encrypted and decrypted. Using private information 102 and encryption parameters 103, encryption engine 101 can produce encrypted information 110. Encryption parameters 103 can include substitution tables and other information necessary to perform the encryption of private information 102. Encryption parameters 103 may also include encryption keys.

Encrypted information 110 can be sent from sending device 100 to receiving device 120. When encrypted information 110 is received at receiving device 120, receiving device 120 may decrypt encrypted information 110. Receiving device 120 can receive and store decryption parameters 121. Decryption parameters 121 may also include decryption keys. Receiving device 120 can use decryption parameters 121 and decryption engine 122 to decrypt encrypted information 110 to produce private information 102. Decryption parameters 121 can include substitution or mapping tables and other information necessary to perform the decryption of encrypted information 110 to produce private information 102. Decryption engine 122 can thus reverse the process that encryption engine 101 performs.

According to embodiments of the invention, some or all of the decryption parameters 121 needed to decrypt the encrypted information 110 may be communicated along with the encrypted information 110, and/or embedded within the encrypted information 110 in the form of time delays. The encrypted information 110 may be segmented into a plurality of data packets of a designated length having transmission time delays between them.

II. SENDING DECODING KEY VIA TIME DELAYS

Embodiments of the invention transmit and receive a plurality of encoded data packets with time delays between them to communicate a decoding key, for example.

A. Data Packets and Time Delays

Figure 2A:
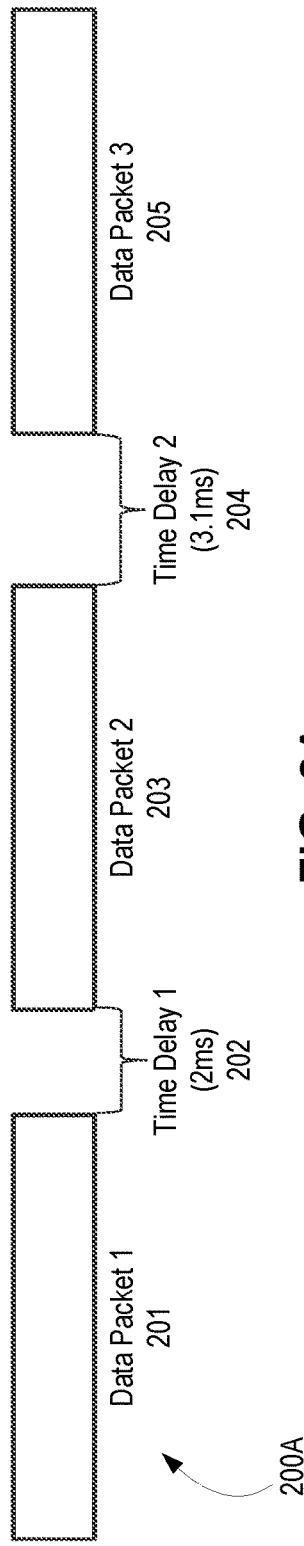
FIG. 2A shows an example sequence of data packets and time delays between data packets according to an embodiment of the present invention.

FIG. 2A shows an example sequence 200A of data packets 201, 203, 205 and time delays 202, 204 between the data packets according to an embodiment of the present invention. The number of data packets and time delays depicted in FIG. 2A is for illustrative purposes only.

Time Delay 1 202 represents the amount of time that lapses between the receipt of Data Packet 1 201 and Data Packet 2 203. In the example shown in FIG. 2A, Time Delay 1 202 is 2 ms. Time Delay 2 204 represents the amount of time that lapses between the receipt of Data Packet 2 203 and Data Packet 3 205. In the example shown in FIG. 2A, Time Delay 2 204 is 3.1 ms.

The time delays between transmission of subsequent data packets may be calculated by the sending device 100 or an application stored on the sending device 100, to allow the time delays to represent a decoding key for decoding the plurality of data packets. Each time delay could represent a different character that when concatenated can indicate a decoding key such as a decryption key or other identifying information (e.g., the location of the fake or pseudo-data in the plurality of data packets). For example, using the example of FIG. 2A, a time delay of 2 ms could represent a first character, while a time delay of 3.1 ms could represent a second character.

Figure 2B:
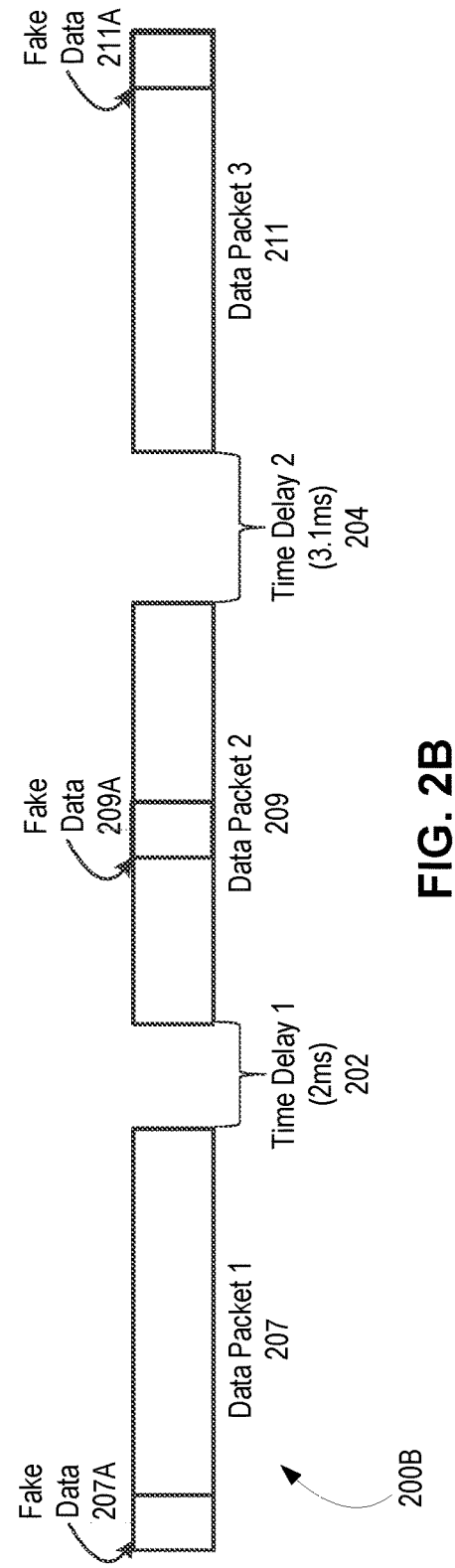
FIG. 2B shows an example sequence of data packets having fake data and time delays between data packets according to an embodiment of the present invention.

FIG. 2B shows another example sequence 200B of data packets 207, 209, 211 and time delays 202, 204 between the data packets according to an embodiment of the present invention. The number of data packets and time delays depicted in FIG. 2B is for illustrative purposes only.

In the example sequence 200B, each data packet includes a portion of fake data. Other embodiments, such as the embodiment shown in FIG. 2A, may not include the fake data in the data packets. The fake data may be used to provide enhanced security to the data packet as the fake data may be indistinguishable from valid data in the data packet without knowing the position and location of the fake data within the data packet. As shown in FIG. 2B, fake data 207A is placed at the beginning of Data Packet 1 207; fake data 209A is placed in the middle of Data Packet 2 209; and fake data 211A is placed at the end of Data Packet 3 211. In some embodiments, the fake data may be placed at any designated location(s) within one or more data packet.

B. System

Figure 3:
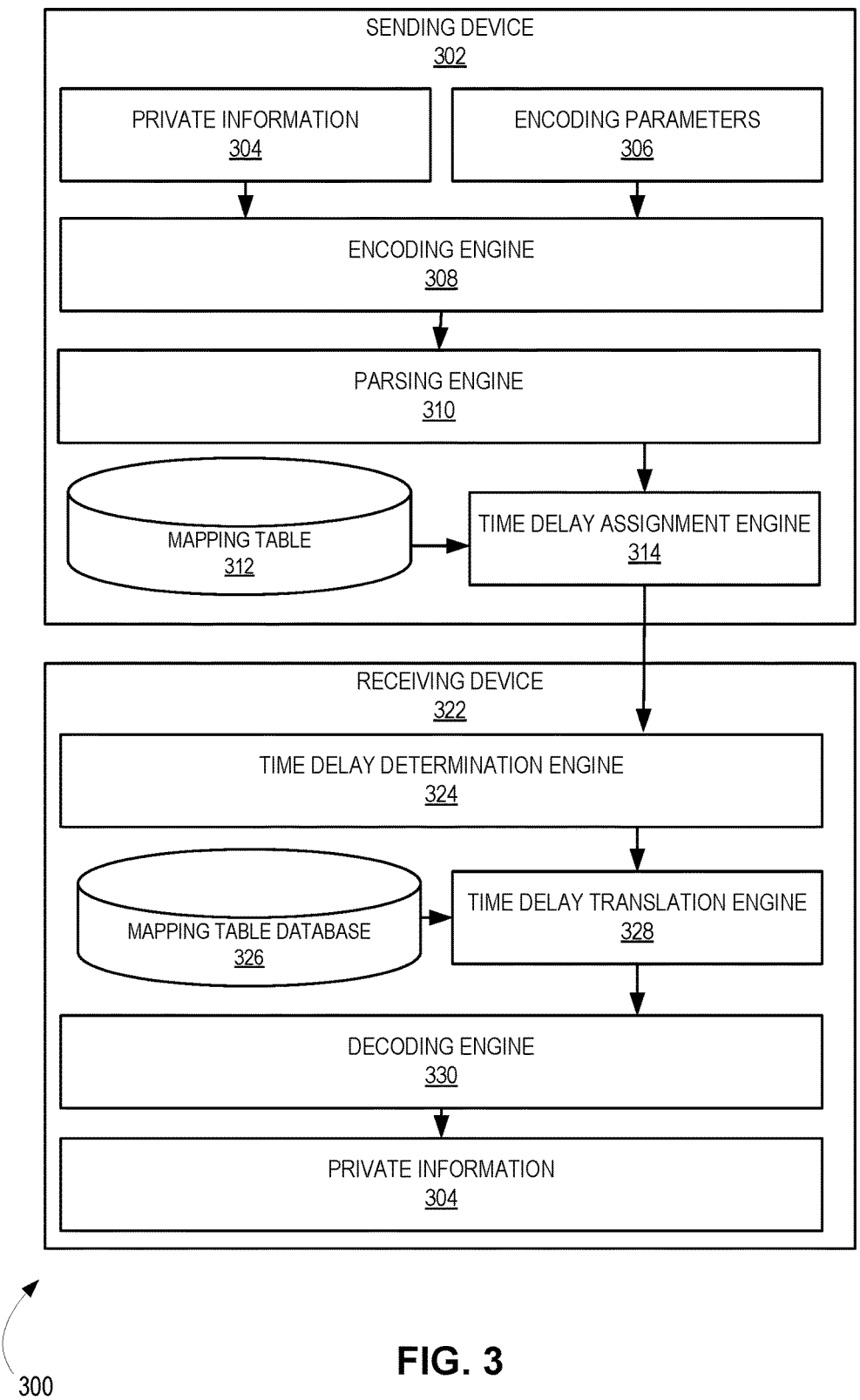
FIG. 3 shows a block diagram of a system for encoding and decoding data using time delays according to an embodiment of the present invention.

FIG. 3 shows a block diagram of a system 300 for encoding and decoding private information 304 using time delays according to an embodiment of the present invention. The system 300 includes a sending device 302 and a receiving device 322. The sending device 302 includes an encoding engine 308, a parsing engine 310, a mapping table 312, and a time delay assignment engine 314. The receiving device 322 includes a time delay determination engine 324, a mapping table database 326, a time delay translation engine 328, and a decoding engine 330.

Sending device 302 can use encoding engine 308 to encode or encrypt private information 304 using encoding parameters 306. Encoding parameters 306 may include an encryption key with which to encrypt private information 304, as well as fake data or pseudo-data to be integrated into private information 304 at specified locations, in one embodiment. Encoding engine 308 can receive private information 304 and encoding parameters 306. Using private information 304 and encoding parameters 306, encoding engine 308 can encrypt the private information 304 using the encryption key provided with encryption parameters 103. In another embodiment in which fake data is utilized, encoding engine 308 may further incorporate the fake data into the private information 304 at the specified locations, prior to or after encrypting the private information 304 using the encryption key.

Parsing engine 310 can receive the encrypted information from encoding engine 308. Parsing engine 310 can segment the encrypted information into a plurality of data packets, each having a particular length. The length of each data packet may be the same or different, and may be assigned randomly, according to breaks in the data, or be specified by the encoding parameters 306. Further, the number of data packets may be assigned randomly, according to breaks in the data, be specified by the encoding parameters 306, and/or be a fraction of the entire data size (e.g., if the encryption key is 8 characters long, the data may be split into 9 data packets of equal or differing length with 8 time delays between them).

Time delay assignment engine 314 may receive the parsed encrypted data from parsing engine 310. A mapping table 312 that assigns time delays to particular values of the encryption key can be selected from a database or generated and sent to time delay assignment engine 314. The mapping table can be selected or generated randomly, or based one or more criteria. For example, the mapping table can be specified by the encoding parameters 306, can be associated with the particular sending device 302, can be associated with the particular receiving device 322, and/or can be selected or generated based on any other criteria. An exemplary mapping table is shown in FIG. 4. However, it is contemplated that any mapping can be used with the same or different time delays corresponding to the same or different values or characters. Once the mapping table is selected, time delay assignment engine 314 can determine the time delay associated with each value of the encryption key, and introduce the corresponding time delay between each data packet of the parsed encrypted data. In one embodiment, a mapping table 312 is not required, and the time delays needed are instead coded in hardware or on a secure software element.

The data can be sent, either directly or indirectly, from sending device 302 to receiving device 322. A time delay determination engine 324 may measure and record the time delays between consecutively received data packets, and provide the time delays to time delay translation engine 328. Time delay translation engine 328 can receive the correct mapping table from mapping table database 326. The mapping table to be used may be indicated by data received from sending device 302, or may be determined based on one or more criteria (e.g., the identity of the sending device 302, the identity of the receiving device 322, etc.). Time delay translation engine 328 uses the mapping table to translate each time delay to a value or character corresponding to that time delay. Time delay translation engine 328 may then concatenate the values to obtain a decoding key. In one embodiment, the decoding key comprises a decryption key. If decryption is used, an encryption/decryption process such as DES, triple DES, ECC, or AES may be utilized. In another embodiment, the decoding key comprises both a decryption key and the location(s) of fake data contained within the encrypted data.

The decoding key can be sent to decoding engine 330, which uses the decryption key to decrypt the encrypted data, and, if used, removes the fake data from the valid data at the locations specified. Thus, decoding engine 330 can produce private information 304.

C. Sequence Diagrams

Figure 5A:
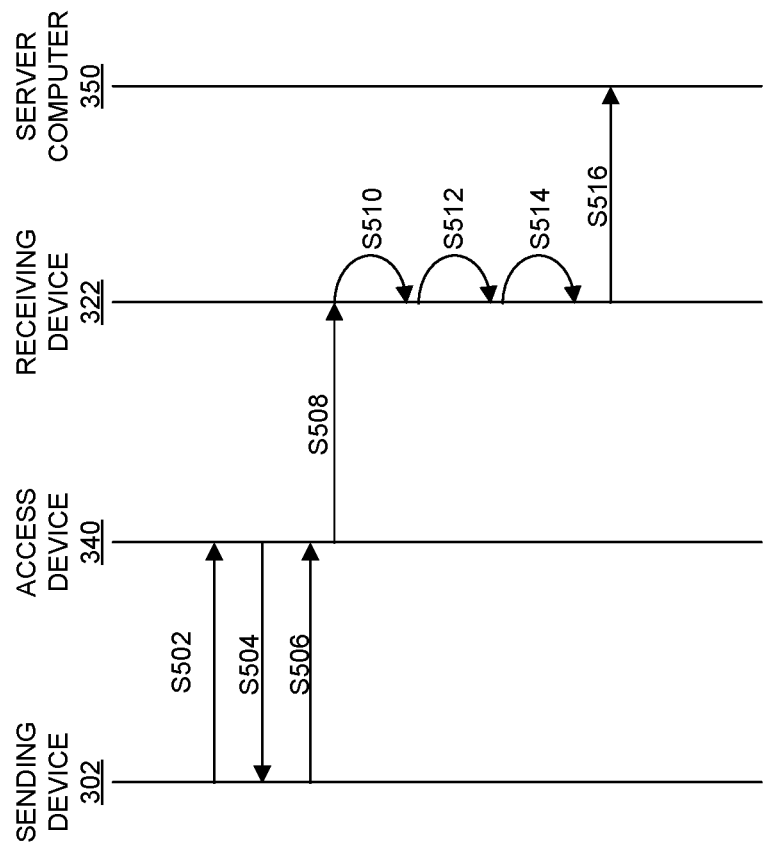
FIG. 5A shows a flow diagram depicting a method for transmitting, receiving and processing encoded data using time delays according to an embodiment of the invention.

FIG. 5A shows a flow diagram depicting a method for transmitting, receiving and processing encoded data using time delays according to an embodiment of the invention. In this embodiment, an access device 340 acts as an intermediary between sending device 302 and receiving device 322. However, it is contemplated that sending device 302 may communicate directly with receiving device 322 in other embodiments.

At step S502, sending device 302 "pings" access device 340 to determine the number of access devices, and to determine the frequency or frequencies on which sending device 302 should communicate with access device 340. At step S504, access device 340 responds that it is a single access device transmitting and receiving on one particular frequency. At step S506, sending device 302 transmits a plurality of data packets including encoded data to access device 340 on the particular frequency.

At step S508, access device 340 transmits the data packets to receiving device 322. At step S510, receiving device 322 determines a plurality of time delays between the data packets. At step S512, receiving device 322 translates the plurality of time delays to obtain a decoding key. At step S514, receiving device 324 uses the decoding key to decode the encoded data. In one embodiment, the decoding key comprises a decryption key. In another embodiment, the decoding key further comprises the location of fake or pseudo-data within the data packets. In that embodiment, receiving device 324 further locates and removes the fake data from the data packets, before or after decrypting the data. At step S516, the receiving device sends the decoded data to a server computer 350 for further processing.

In the above described embodiments, only one receiving device 322 having one receiver is used to receive data from sending device 302 at a particular frequency. However, to further protect private information 304, encrypted and time delayed data may be sent at two or more frequencies to two or more receivers within a receiving device 322, or to two or more separate receiving devices 322, as described further herein.

Figure 5B:
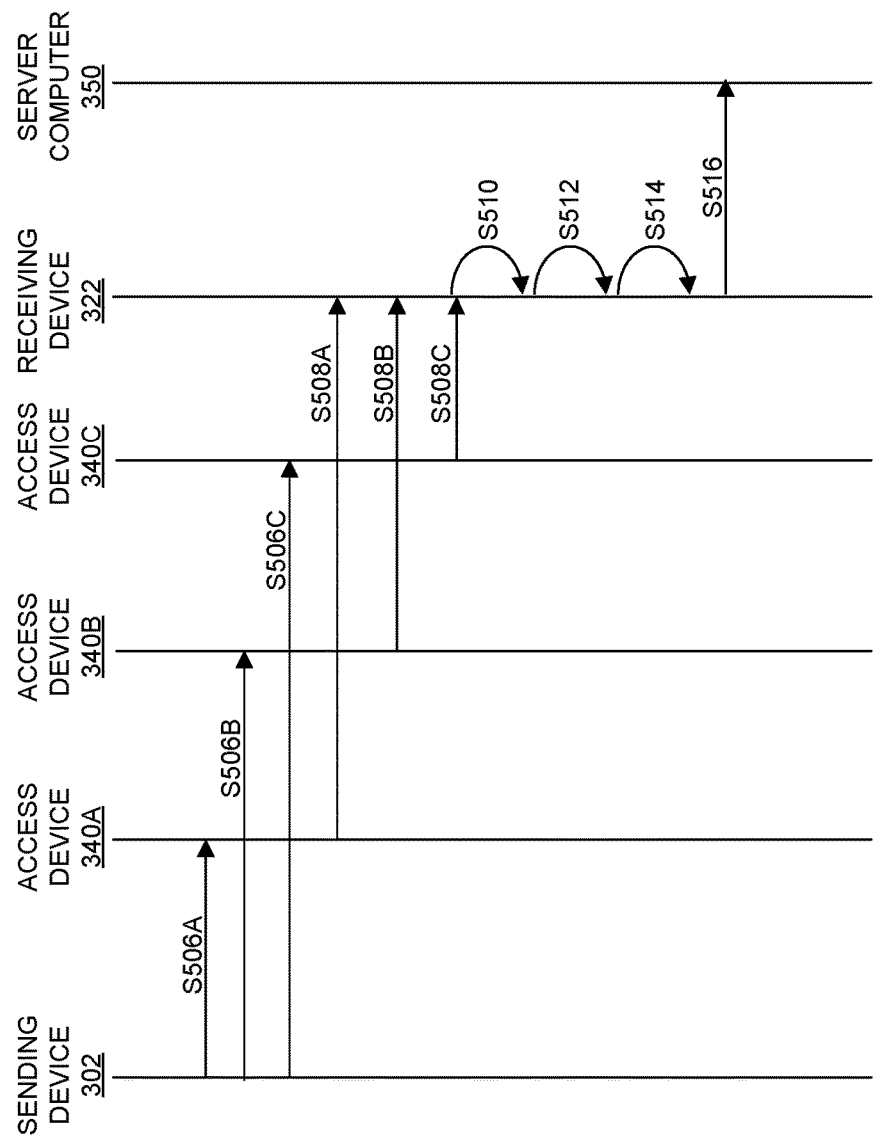
FIG. 5B shows a flow diagram depicting a method for transmitting, receiving and processing encoded data using time delays according to an embodiment of the invention.

FIG. 5B shows a flow diagram depicting a method for transmitting and receiving encoded data at multiple frequencies using time delays, as well as the processing of the encoded data, according to an embodiment of the invention. In this embodiment, an access device 340 acts as an intermediary between sending device 302 and receiving device 322. However, it is contemplated that sending device 302 may communicate directly with receiving device 322 in other embodiments.

Sending device 302 may initially "ping" access devices 340A-C to determine the number of access devices available, and to determine the frequencies on which sending device 302 should communicate with access devices 340A-C (not shown). Access devices 340A-C may each respond with their transceiving frequencies (not shown), such that sending device 302 can ascertain that there are three available access devices 340A-C, each operating at different frequencies. Although shown and described as having three access devices 340A-C, it is contemplated that any number of access devices may be used. Sending device 302 may then split the data to be transmitted into three separate sets or sequences of data packets (not shown).

Turning back to FIG. 5B, at step S506A, sending device 302 transmits a first sequence of data packets including encoded data to access device 340A at a first frequency. At step S506B, sending device 302 transmits a second sequence of data packets including encoded data to access device 340B at a second frequency. At step S506C, sending device 302 transmits a third sequence of data packets including encoded data to access device 340C at a third frequency.

At step 508A, access device 340A transmits the first sequence of data packets to receiving device 322. At step 508B, access device 340B transmits the second sequence of data packets to receiving device 322. At step 508C, access device 340C transmits the third sequence of data packets to receiving device 322.

In some embodiments, the plurality of data packets may be received by the plurality of access devices 340A-C with a timestamp assigned to each data packet in the plurality of data packets based on the time of reception. In such embodiments, the plurality of data packets may then be sent to the receiving device 322 to perform processing to identify the time delays between the plurality of data packets based on the timestamps. For example, a first data packet may be received by access device 340A at time 12:03:23:191 PM on 2/14/2015, and a second data packet may be received by access device 2 340B at time 12:03:23:220 PM on 2/14/2015.

At step S510, receiving device 322 determines a plurality of time delays between the data packets received from access devices 340A-C. As described further herein, the time delays for each set or sequence of data packets may be determined separately, or the time delays between packets of different sequences of data packets may be determined collectively. In either case, receiving device 322 may then piece together the data packets from separate sequences in the correct order to obtain a single sequence of data packets. The correct order of the data packets may be sequential, according to their timestamps, in one embodiment. In another embodiment, the data packets may be received with packet location information indicating the order of the data packets. This packet location information may be direct (e.g., each data packet is given a sequential location of 1, 2, 3, etc.), or indirect (e.g., each data packet contains an identifier and a cross-reference table is used to determine the location associated with that identifier).

At step S512, receiving device 322 translates the plurality of time delays to obtain a decoding key. At step S514, receiving device 324 uses the decoding key to decode the encoded data. In one embodiment, the decoding key comprises a decryption key. In another embodiment, the decoding key further comprises the location of fake or pseudo-data within the data packets. In that embodiment, receiving device 324 further locates and removes the fake data from the data packets, before or after decrypting the data. At step S516, the receiving device sends the decoded data to a server computer 350 for further processing.

D. Time Delays Between Multiple Sequences of Data Packets

Figure 6A:
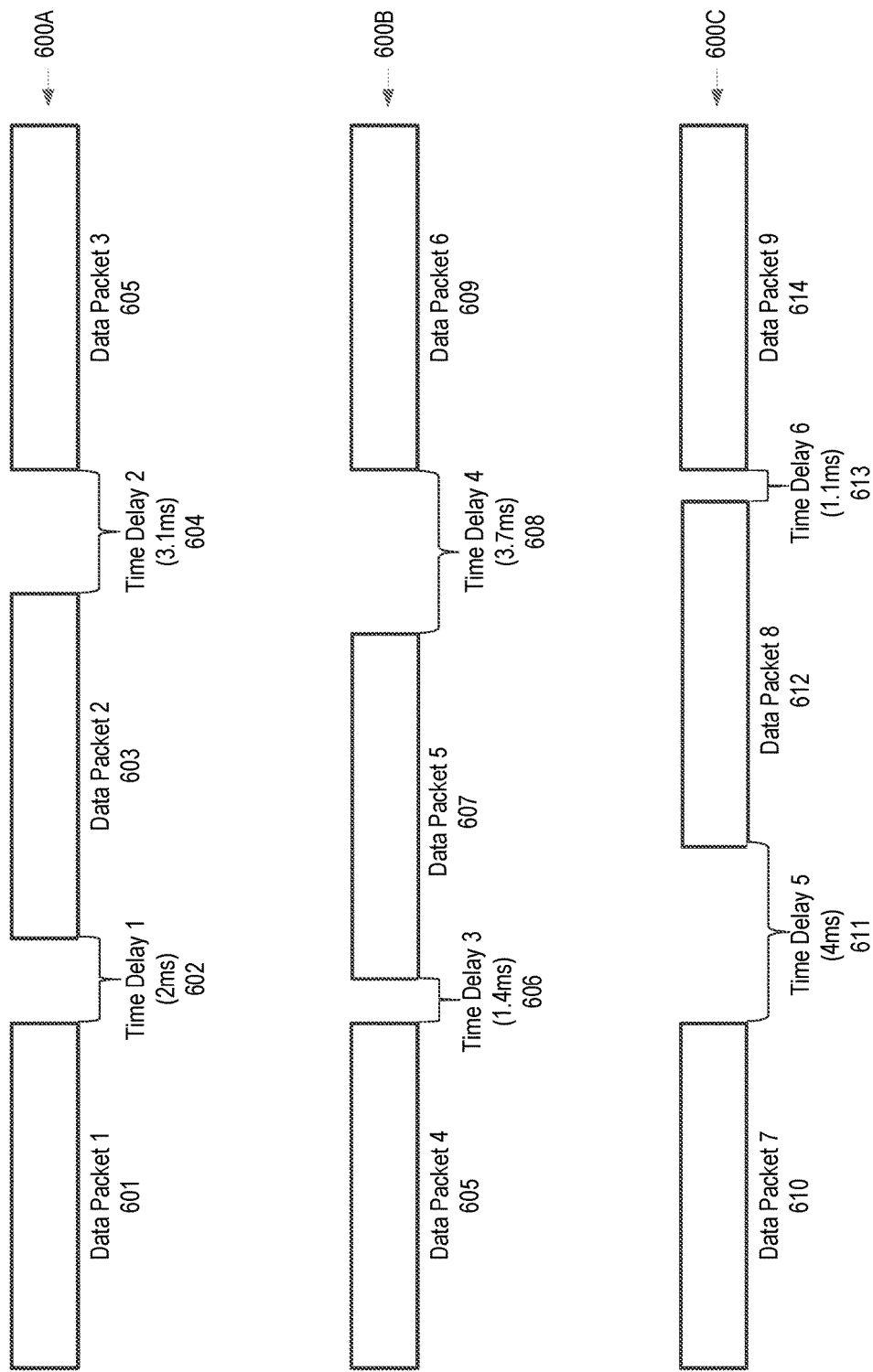
FIG. 6A shows example sequences of data packets received at different frequencies and time delays between data packets being determined individually according to an embodiment of the present invention.

FIG. 6A shows example sequences 600A-C of sets of data packets received at different frequencies and time delays between data packets being determined individually according to an embodiment of the present invention. The number of sequences of data packets, the number of data packets within each sequence, and the number and amount of time delays depicted in FIG. 6A is for illustrative purposes only.

As noted above, the time delays for each sequence of data packets 600A-C are determined separately in this embodiment. Thus, in sequence 600A received at a first frequency, Time Delay 1 602 represents the amount of time that lapses between the receipt of Data Packet 1 601 and Data Packet 2 603. In the example shown in FIG. 6A, Time Delay 1 602 is 2 ms. Time Delay 2 604 represents the amount of time that lapses between the receipt of Data Packet 2 603 and Data Packet 3 605. In this example, Time Delay 2 604 is 3.1 ms.

In sequence 600B received at a second frequency, Time Delay 3 606 represents the amount of time that lapses between the receipt of Data Packet 4 605 and Data Packet 5 607. In this example, Time Delay 3 606 is 1.4 ms. Time Delay 4 608 represents the amount of time that lapses between the receipt of Data Packet 5 607 and Data Packet 6 609. In this example, Time Delay 4 608 is 3.7 ms.

In sequence 600C received at a third frequency, Time Delay 5 611 represents the amount of time that lapses between the receipt of Data Packet 7 610 and Data Packet 8 612. In this example, Time Delay 5 is 4 ms. Time Delay 6 represents the amount of time that lapses between the receipt of Data Packet 8 612 and Data Packet 9 614. In this example, Time Delay 6 613 is 1.1 ms.

Each time delay of Time Delays 1-6 may represent a different value or character. For example, applying the exemplary mapping table of FIG. 4, Time Delay 1 602 could correspond to "C"; Time Delay 2 604 could correspond to "Z"; Time Delay 3 606 could correspond to "P"; Time Delay 4 608 could correspond to "1"; Time Delay 5 611 could correspond to "5"; and Time Delay 6 613 could correspond to "W". The values can be concatenated to obtain a decoding key, which in this example, is or begins with CZP15W.

Figure 6B:
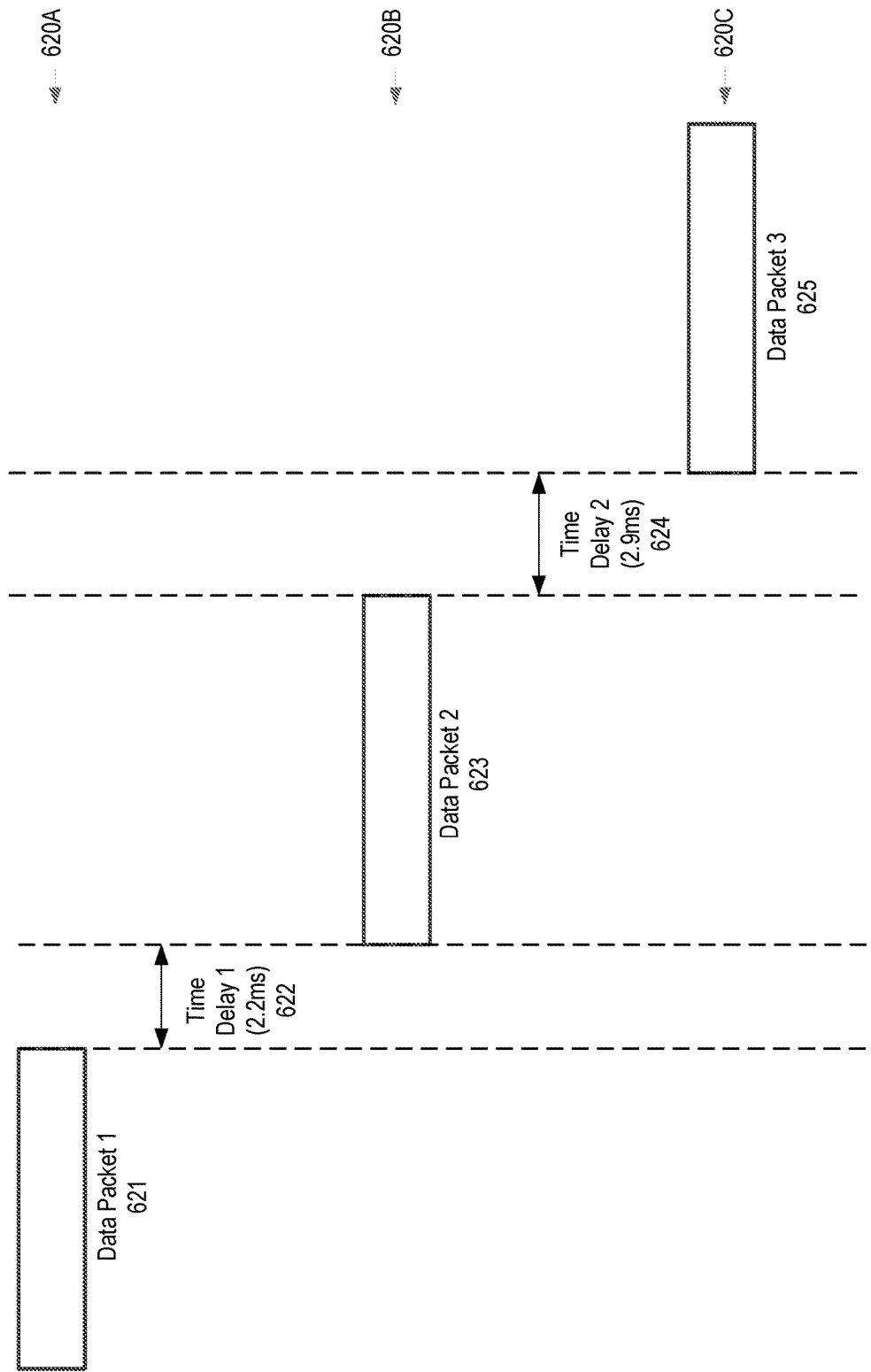
FIG. 6B shows example sequences of data packets received at different frequencies and time delays between data packets being determined collectively according to an embodiment of the present invention.

FIG. 6B shows example sequences of sets of data packets 620A-C received at different frequencies and time delays between data packets being determined collectively according to an embodiment of the present invention. The number of sequences of data packets, the number of data packets within each sequence, and the number and amount of time delays depicted in FIG. 6B is for illustrative purposes only.

As noted above, the time delays for the sequences of data packets 620A-C are determined collectively in this embodiment. A first data packet, Data Packet 1 621 of sequence 620A, is received first at a first frequency. A second data packet, Data Packet 2 623 of sequence 620B, is received second at a second frequency. A third data packet, Data Packet 3 625 of sequence 620C, is received third at a third frequency. Time Delay 1 622 represents the amount of time that lapses between the receipt of the first data packet, Data Packet 1 621, and the second Data Packet, Data Packet 2 623. In the example shown in FIG. 6B, Time Delay 1 622 is 2.2 ms. Time Delay 2 624 represents the amount of time that lapses between receipt of the second data packet, Data Packet 2 623, and the third data packet, Data Packet 3 625. In this example, Time Delay 2 624 is 2.9 ms.

Each time delay of Time Delays 1-2 may represent a different value or character. For example, applying the exemplary mapping table of FIG. 4, Time Delay 1 622 could correspond to "2", and Time Delay 2 624 could correspond to "4". The values can be concatenated to obtain a decoding key, which in this example, is or begins with 24.

III. TRANSACTION PROCESSING

Figure 7:
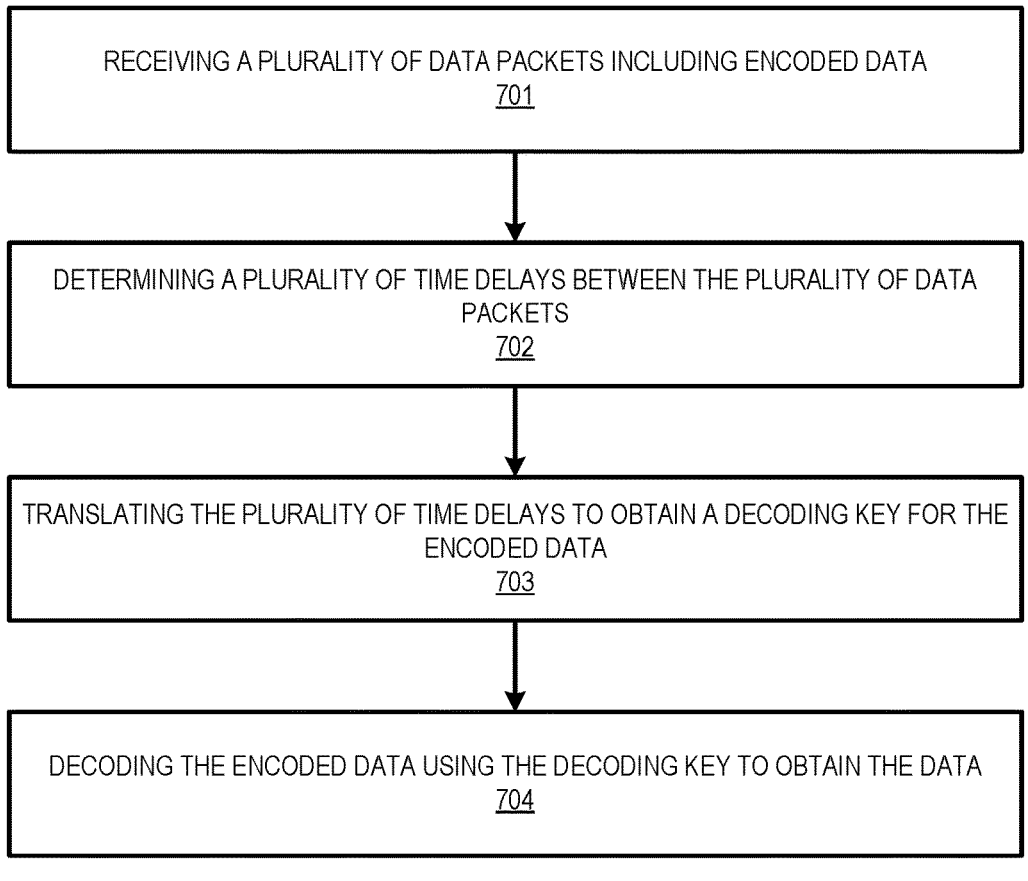
FIG. 7 shows a flow diagram depicting the processing of encoded data according to an embodiment of the present invention.

In one embodiment, the systems and methods described herein can be applied to transaction processing. Specifically, the systems and methods described herein can be used to encode and decode transaction data. FIG. 7 shows a flow diagram depicting transmitting encrypted data according to an embodiment of the present invention. Additional methods and processes may be included within these methods and may be recognized by one of ordinary skill in the art, in light of the description below. Further, in some embodiments of the present invention, the described methods may be combined, mixed, and matched, as one of ordinary skill would recognize. In the embodiment described below, the server computer may be a server computer associated with a resource provider computer. In other embodiments, the functions and processes described below may be performed by a different entity and system than a resource provider computer, including, but not limited to, a transaction processing computer.

In step 701, the server computer receives a plurality of data packets, the data packets including encoded data. In some embodiments, the encoded data may be data for a payment transaction between a user of a portable communication device and a resource provider. For example, the encoded data may be payment data for the payment transaction, including an account number for a payment account, a PIN, an expiration date, and/or a user name and address associated with the payment account.

In embodiments of the present invention, the plurality of data packets may be received from the portable communication device via one or more of a plurality of access devices. The number of access devices may be determined by the portable communication device through an initial communication (e.g., pinging operation). In the initial communication, the portable communication device may determine the number of access devices associated with a resource provider computer, as well as the frequencies of the receivers associated with the access devices.

In some embodiments, once the number of access devices and the frequencies are known to the portable communication device, the portable communication device may send a message to the access devices indicating a decryption key associated with data packets that may be sent by the portable communication device. The portable communication device may also send data indicating the location of fake or pseudo-data within the data packets. In other embodiments, the portable communication device may only send data indicating the length of data packets and the number of data packets that will be sent to the access devices if and when the portable communication device may send data. For example, the length of the real or fake data can be provided, with the order being predetermined or specified with a binary digit. In such embodiments, the resource provider computer may then have information on how to decrypt and decode data packets sent from the portable communication device.

In embodiments where the plurality of data packets are received using a single access device, the single access device may have a plurality of receivers that each are configured to receive data at different frequencies. In such embodiments, each receiver of the plurality of receivers may receive a different subset of the plurality of data packets.

In embodiments where the plurality of data packets are received using a plurality of access devices, each access device of the plurality of access devices may receive a different subset of the plurality of data packets. In some embodiments, each device in the plurality of access devices may be configured to receive data packets related to different portions of transaction data. For example, access device 1 may receive data packets related to an account number or PAN, access device 2 may receive data packets related to a PIN value, and access device 3 may receive data packets related to an expiration data. Each access device may have a receiver configured to receive data at a different frequency, and thus may receive a different number of packets.

The plurality of data packets received by the plurality of access devices may then be sent to the server computer. In some embodiments, the server computer is a resource provider computer.

In step 702, the server computer determines a plurality of time delays between the plurality of data packets. In some embodiments of the present invention, the server computer may determine the time delays between sequential data packets in the plurality of data packets.

In other embodiments, where the plurality of data packets are received by the plurality of access devices, the server computer may determine the time delays between data packets received at each access device separately. For example, if access device 1 received data packets 1 and 4, access device 2 received data packets 2 and 5, and access device 3 received data packets 3 and 6, the time delays may be based on the time delay between packets 1 and 4, the time delay between packets 2 and 5, and the time delay between packets 3 and 6.

In another embodiment, the server computer may determine the time delays between data packets based on a timestamp associated with each data packet. The timestamp associated with each data packet may be assigned to each data packet when it is received at one of the plurality of merchant devices. Using the example above, the server computer may determine the time delay between data packet 1 received by access device 1 and data packet 2 received by access device 2, and so on.

In step 703, the server computer translates the plurality of time delays to obtain a decoding key for decoding the encoded data in the data packets. After the server computer has determined or calculated all of the time delays (or a specified number of time delays) between the plurality of data packets, the server computer may then translate the time delays to obtain the decoding key. In some embodiments, the server computer may translate the time delays using a mapping table, such as the mapping table illustrated in FIG. 4.

In some embodiments, there may be a plurality of mapping tables with different correspondences between time delays and values. In such embodiments, the plurality of data packets may indicate the appropriate mapping table. In other embodiments, the appropriate mapping table may be identified through an initial communication between the portable communication device and the plurality of access devices. The server computer may retrieve the appropriate mapping table identified by either the plurality of data packets and/or the initial communication.

In step 704, the server computer decodes the encoded data to obtain the data using the decoding key. After the decoding key has been determined, the server computer may decode the encoded data. The server computer may use the decoding key to decrypt the encoded data. In some embodiments, where the decoding key also identifies the location of the fake or pseudo-data in the plurality of data packets, the server computer may extract the real data from the plurality of data packets.

Once the server computer has decoded the encoded data, the server computer can process the encoded data. In embodiments where the encoded data is transaction data for a payment transaction, the server computer may generate an authorization request message, which may be sent to an authorizing entity computer, associated with an issuer of the payment account. The authorization request message may then be processed by the authorizing entity computer and the payment transaction may proceed based on an authorization response message received from the authorizing entity computer.

IV. EXAMPLES

A. Authorization

Figure 8:
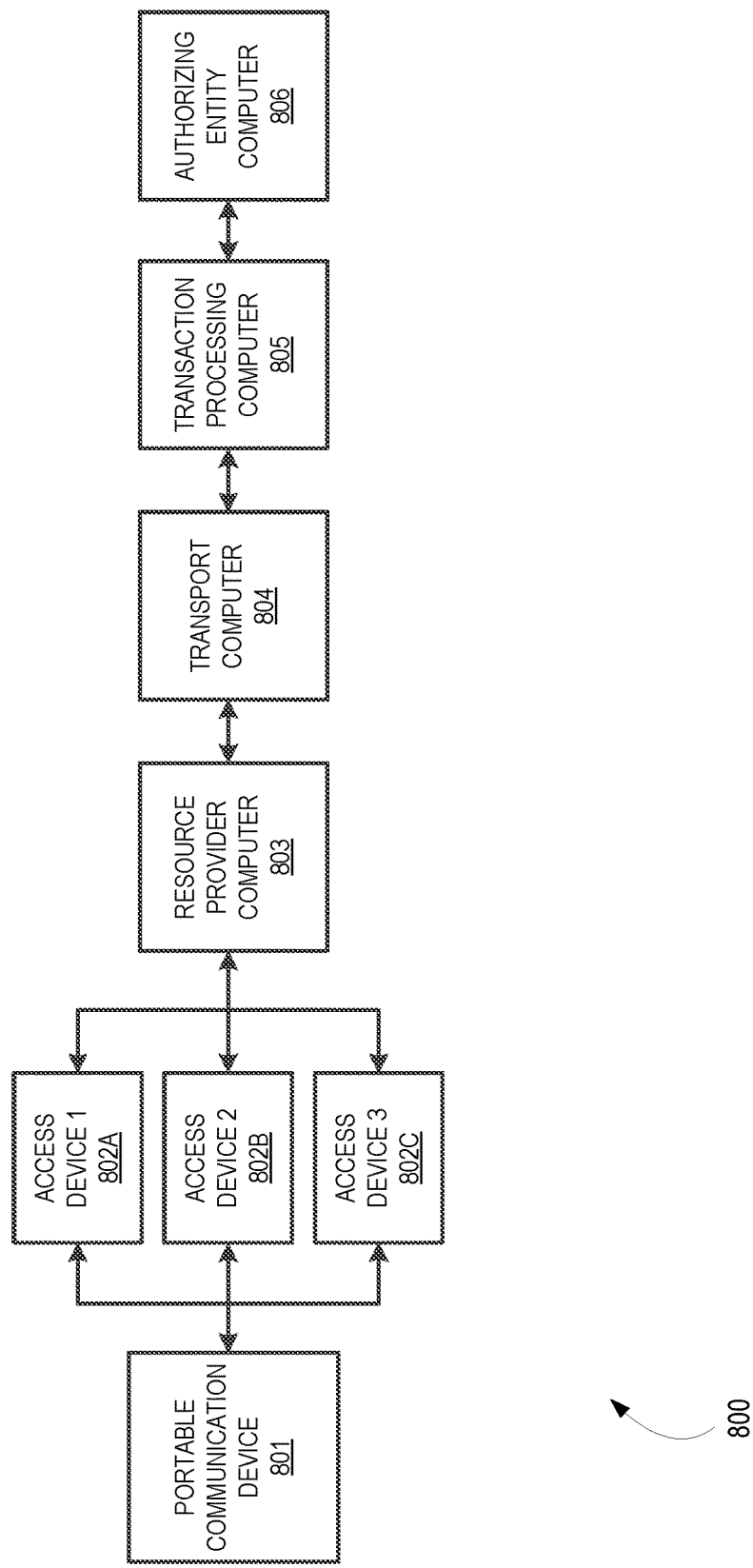
FIG. 8 shows a block diagram of a transaction processing system for processing transactions using data packets received across multiple channels according to an embodiment of the present invention.

FIG. 8 shows a block diagram of a transaction processing system 800 for processing transactions using data packets received across multiple channels according to an embodiment of the present invention. The system 800 includes a portable communication device 801, access devices 1-3

802A-802C, a resource provider computer 803, a transport computer 804, a transaction processing computer 805, and an authorizing entity computer 806. In some embodiments, the portable communication device 801 may be operated by a user.

Each of these systems and computers may be in operative communication with each other. For simplicity of illustration, a certain number of components are shown in FIG. 8. It is understood, however, that embodiments of the invention may include more than one of each component. In addition, some embodiments of the invention may include fewer than or greater than all of the components shown in FIG. 8. In addition, the components in FIG. 8 may communicate via any suitable communication medium (including the Internet), using any suitable communications protocol.

The portable communication device 801 may include a processor and a computer readable medium coupled to the processor, the computer readable medium comprising code, executable by the processor for performing the functionality described herein, such as the functionality of the sending device 100 and/or the sending device 302. The portable communication device 801 may be communicatively coupled to the resource provider computer 803 via one or more access devices 802A-C in order to conduct a transaction with a resource provider associated with the resource provider computer 803.

The portable communication device 801 may be in any suitable form. For example, suitable portable communication devices 801 may be hand-held and compact so that they can fit into a user's pocket. Example of portable communication devices 801 include any device capable of accessing the Internet, such as a personal computer, cellular or wireless phones, personal digital assistants (PDAs), tablet computers, laptop computers, and handheld specialized readers. Additional portable communication devices 801 may also include wearable devices, such as smart watches, fitness bands, ankle bracelets, rings, earrings, etc. In some embodiments of the invention, the portable communication device 801 and a payment device associated with the user may be a single device (e.g., a mobile phone).

In some embodiments, the portable communication device 801 may include a browser and/or applications (e.g., mobile applications, computer programs) stored in the memory and configured to retrieve, present, and send data across a communications network (e.g., the Internet).

The access devices 802A-C may be comprised of various modules that may be embodied by computer code, residing on computer readable media. The access devices 802A-C may include a processor and a computer readable medium coupled to the processor, the computer readable medium comprising code, executable by the processor for performing the functionality described herein, such as the functionality of receiving device 120, receiving device 322, access device 340, and/or access devices 340A-C. Each of the access devices 802A-C may be configured to receive and send data at a different receiving frequency than the other access devices 802A-C. For example, access device 1 802A may receive data at a first receiving frequency, access device 2 802B may receive data at a second receiving frequency different from the first receiving frequency, and so on.

Although the embodiment shown in FIG. 8 depicts three access devices 802A-C, in some embodiments, there may be a greater number or a lesser number of access devices. For example, in some embodiments, the system 800 may include a single access device 802A containing a plurality of receivers, wherein each receiver may be configured to receive and send data at a different receiving frequency than the other receivers. The access devices 802A-C may be configured to receive and send data using a wireless communications protocol (e.g., Bluetooth™ or other suitable RF or wireless signal).

The resource provider computer 803 may be comprised of various modules that may be embodied by computer code, residing on computer readable media. The resource provider computer 803 may include a processor and a computer readable medium coupled to the processor, the computer readable medium comprising code, executable by the processor for performing the functionality described herein, such as the functionality of receiving device 120, receiving device 322, and/or server computer 350. The resource provider computer 803 may be in any suitable form. Examples of the resource provider computer 803 may include a web server computer hosting a merchant Internet website. Additional examples of resource provider computers 803 include any device capable of accessing the Internet, such as a personal computer, cellular or wireless phones, personal digital assistants (PDAs), tablet computers, and handheld specialized readers.

The transport computer 804 is typically associated with a business entity (e.g., a commercial bank) that has a business relationship with a particular resource provider or other entity and that may be involved in the process of transaction. The transport computer 804 may issue and manage accounts for resource providers and exchange funds with the authorizing entity computer 806 on behalf of the resource provider. Some entities can perform both transport computer 804 and the authorizing entity computer 806 functions. Embodiments of the present invention encompass such single entity computers. The transaction processing computer 805 may provide transaction authorization and clearing and settlement services between the transport computer 804 and the authorizing entity computer 806 for standard transactions.

The transaction processing computer 805 may comprise a server computer. The server computer may include a processor and a computer readable medium coupled to the processor, the computer readable medium comprising code, executable by the processor. In some embodiments, the server computer may be coupled to a database and may include any hardware, software, other logic, or combination of the preceding for servicing the requests from one or more client computers.

The transaction processing computer 805 may include data processing subsystems, networks, and operations used to support and deliver authorization services, exception file services, and clearing and settlement services. An exemplary transaction processing computer 805 may include VisaNet™. Networks that include VisaNet™ are able to process credit card transactions, debit card transactions, and other types of commercial transactions. VisaNet™, in particular, includes an integrated payments system that processes authorization requests and a Base II system that performs clearing and settlement services. The transaction processing computer 805 may use any suitable wired or wireless network, including the Internet.

The authorizing entity computer 806 is typically associated with a business entity (e.g., a bank). The authorizing entity computer 806 may comprise a server computer. The server computer may include a processor and a computer readable medium coupled to the processor, the computer readable medium comprising code, executable by the processor. In some embodiments, the authorizing entity computer 806 may communicate with the transaction processing computer 805 to provide authentication processes and account information associated with an account of the user. The authorizing entity computer 806 may maintain financial accounts for the user, and can issue payment devices, such as a credit or debit card to the user.

Although shown and described as primarily being used between portable communication device 801 and access devices 1-3 802A-802C, and/or between access devices 1-3 802A-802C and resource provider computer 803, it is contemplated that embodiments of the invention may be implemented to provide secure communications between any of the computers and/or devices shown in FIG. 8.

B. Additional Embodiments

In one embodiment, as part of an initial communication to identify the plurality of access devices, the sending device may send the decoding key (e.g., the decryption key and/or the locations of fake data) using the time delays between random or dummy data rather than the actual data. In such embodiments, the access device may have the decoding key prior to being sent the encoded plurality of data packets, and the encoded plurality of data packets may then be sent without regard to the time delay between the plurality of data packets.

In other embodiments, an additional authentication layer may be required on the sending device before the mapping information or initial communication may be conducted between the sending device and the receiving device(s). In such embodiments, the user may be required to provide a biometric authentication (e.g., a fingerprint) or a gesture authentication (e.g., shake or movement of the portable communication device in a particular manner). In such embodiments, once the user has successfully been authenticated using the biometric or gesture authentication, the portable communication device may send the information for mapping the time delays to characters or values for decoding the encrypted data.

In other embodiments, the secure multi-channel communication system and method described herein can be used in any of a number of contexts, in addition to or alternative to the transaction processing context described above. For example, the encoding processes described herein may be used to protect any type of personal, valuable, and/or sensitive identifiers or data during transmission between devices. Such identifiers or data may include user names and passwords, access credentials, or any other type of authorization credentials or information.

V. EXAMPLE COMPUTER SYSTEMS

The various participants and elements described herein may operate one or more computer apparatuses to facilitate the functions described herein. Any of the elements in the above-described FIGS. 1, 3, and 7, including any servers or databases, may use any suitable number of subsystems to facilitate the functions described herein.

Such subsystems or components are interconnected via a system bus. Subsystems may include a printer, keyboard, fixed disk (or other memory comprising computer readable media), monitor, which is coupled to display adapter, and others. Peripherals and input/output (I/O) devices, which couple to an I/O controller (which can be a processor or other suitable controller), can be connected to the computer system by any number of means known in the art, such as a serial port. For example, a serial port or an external interface can be used to connect the computer apparatus to a wide area network such as the Internet, a mouse input device, or a scanner. The interconnection via the system bus allows the central processor to communicate with each subsystem and to control the execution of instructions from system memory or the fixed disk, as well as the exchange of information between subsystems. The system memory and/or the fixed disk may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A computer comprising:
   a processor; and
   a memory coupled to the processor, the memory storing instructions, which when executed by the processor, cause the computer to perform operations including:
   receiving a plurality of data packets including encoded data,
   determining a plurality of time delays between the plurality of data packets,
   translating the plurality of time delays to obtain a decoding key for decoding the encoded data in the data packets, wherein translating the plurality of time delays includes:
   retrieving a mapping table,
   for each time delay in the plurality of time delays:
   correlating the time delay to an entry in the mapping table, and
   retrieving a value associated with the entry, and
   concatenating the retrieved values to form a string of characters corresponding to the decoding key; and
   decoding the encoded data using the decoding key to obtain data.

2. The computer of claim 1, wherein the decoding key includes one or more of a decryption key and location data indicating one or more locations of fake data in the plurality of data packets.

3. The computer of claim 1, wherein the data is transaction data.

4. A computer comprising:
   a processor; and a memory coupled to the processor, the memory storing instructions, which when executed by the processor, cause the computer to perform operations including:

receiving a plurality of data packets including encoded data, wherein the plurality of data packets are received at different frequencies, determining a plurality of time delays between the plurality of data packets, wherein determining the plurality of time delays between the plurality of data packets comprises calculating the plurality of time delays separately for data packets received at each frequency, translating the plurality of time delays to obtain a decoding key for decoding the encoded data in the data packets; and decoding the encoded data using the decoding key to obtain data.

5. The computer of claim 4, wherein data packets received at different frequencies correspond to different portions of data.

6. The computer of claim 4, wherein the decoding key includes one or more of a decryption key and location data indicating one or more locations of fake data in the plurality of data packets.

7. A computer comprising:
a processor; and
a memory coupled to the processor, the memory storing instructions, which when executed by the processor, cause the computer to perform operations including:

receiving a plurality of data packets including encoded data, wherein the plurality of data packets are received at different frequencies, determining a plurality of time delays between the plurality of data packets, wherein determining the plurality of time delays between the plurality of data packets comprises calculating the plurality of time delays aggregately for data packets received at all frequencies, translating the plurality of time delays to obtain a decoding key for decoding the encoded data in the data packets; and decoding the encoded data using the decoding key to obtain data.

8. The computer of claim 7, wherein data packets received at different frequencies correspond to different portions of data.

9. The computer of claim 7, wherein the decoding key includes one or more of a decryption key and location data indicating one or more locations of fake data in the plurality of data packets.

10. The computer of claim 7, wherein the plurality of time delays are calculated aggregately for data packets received at all frequencies in an order determined by a timestamp assigned to each data packet.

11. The computer of claim 7, wherein the plurality of time delays are calculated aggregately for data packets received at all frequencies in an order determined by packet location information associated with each data packet.

12. A method comprising:
receiving, by a computer, a plurality of data packets including encoded data;
determining, by the computer, a plurality of time delays between the plurality of data packets;
translating, by the computer, the plurality of time delays to obtain a decoding key for decoding the encoded data in the data packets, wherein translating the plurality of time delays includes:
retrieving a mapping table,
for each time delay in the plurality of time delays:
correlating the time delay to an entry in the mapping table, and
retrieving a value associated with the entry, and
concatenating the retrieved values to form a string of characters corresponding to the decoding key; and
decoding, by the computer, the encoded data using the decoding key to obtain data.

13. The method of claim 12, wherein the plurality of data packets are received at different frequencies.

14. The method of claim 13, wherein each of a plurality of devices are used to receive one or more of the plurality of data packets at a different frequency.

15. The method of claim 13, wherein each of a plurality of receivers within a single device are used to receive one or more of the plurality of data packets at a different frequency.

16. The method of claim 13, wherein determining the plurality of time delays between the plurality of data packets comprises calculating the plurality of time delays separately for data packets received at each frequency.

17. The method of claim 13, wherein determining the plurality of time delays between the plurality of data packets comprises calculating the plurality of time delays aggregately for data packets received at all frequencies.

18. The method of claim 12, wherein the decoding key includes one or more of a decryption key and location data indicating a location of fake data in the plurality of data packets.

19. The method of claim 12, wherein the data is transaction data.

20. The method of claim 17, wherein the plurality of time delays are calculated aggregately for data packets received at all frequencies in an order determined by a timestamp assigned to each data packet.

* * * * *